May 1, 1956  H. A. GEISLER  2,743,997
FREEZE PREVENTION IN JET AIRCRAFT PURGE GAS GENERATORS
Filed March 19, 1953  2 Sheets-Sheet 1

Inventor:
Henry A. Geisler
By Ahlberg, Wupper & Graudolph
Attorneys.

May 1, 1956 H. A. GEISLER 2,743,997
FREEZE PREVENTION IN JET AIRCRAFT PURGE GAS GENERATORS
Filed March 19, 1953 2 Sheets-Sheet 2
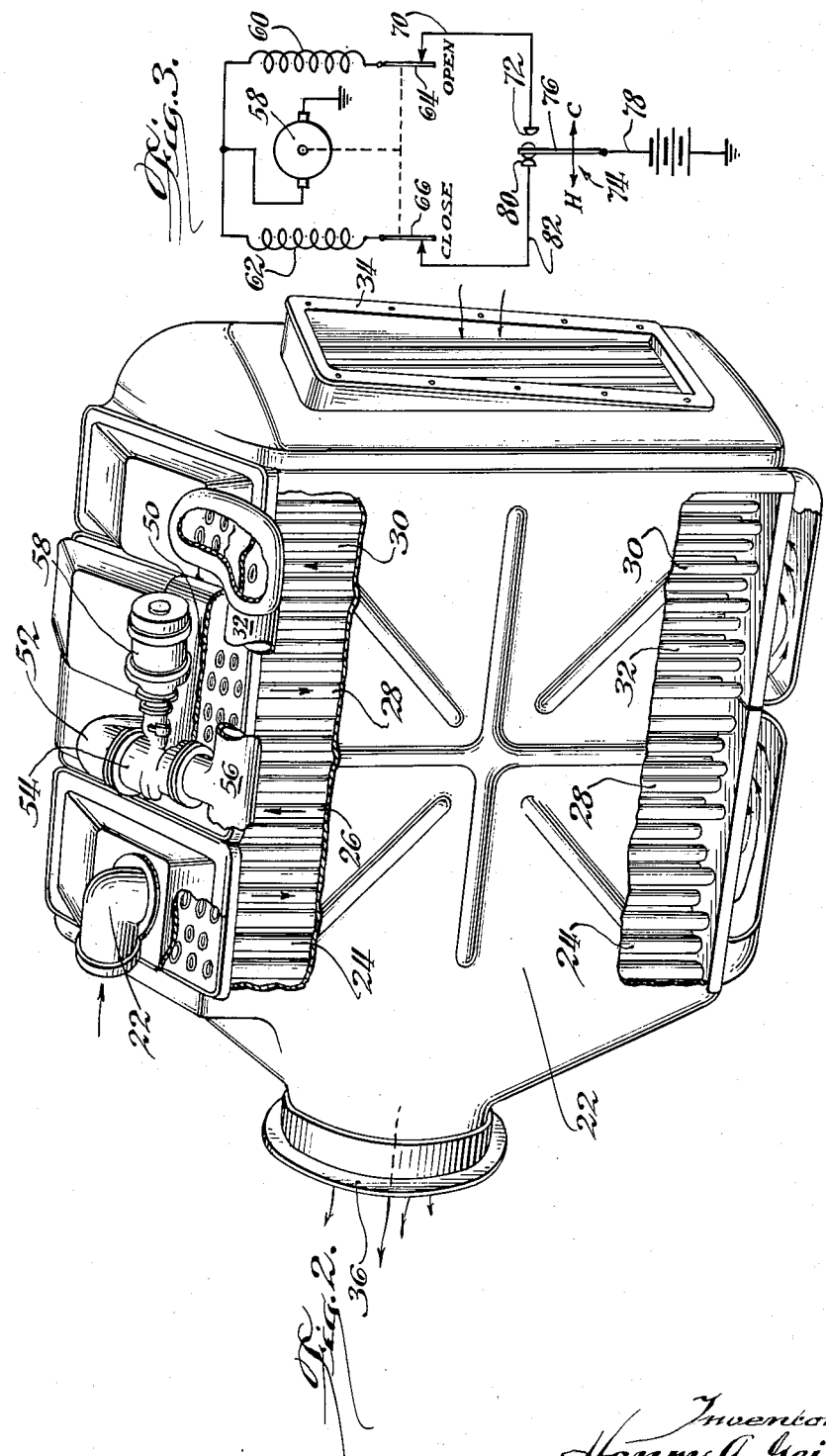
Inventor:
Henry A. Geisler
By Ahlberg, Wupper & Bradolph
Attorneys United States Patent Office 2,743,997
Patented May 1, 1956

2,743,997

FREEZE PREVENTION IN JET AIRCRAFT PURGE GAS GENERATORS

Henry A. Geisler, Indianapolis, Ind., assignor to Stewart-Warner Corporation, Chicago, Ill., a corporation of Virginia Application March 19, 1953, Serial No. 343,373

2 Claims. (Cl. 23—281)

The present invention relates to purge gas generators for jet aircraft, and more particularly to the prevention of freezing in the gas passages of such generators.

As is more completely described in the copending application of Donald A. Potter and Henry A. Geisler, Serial No. 324,974, filed December 9, 1952, and assigned to the same assignee of record as the present application, there is much closed space within an aircraft which is not occupied by personnel and in which explosions or fires may occur. This is because accident or damage may permit fuel to leak from the fuel cells or fuel lines into these spaces and mix with atmospheric air. Also, of course, the vapor and air mixture above the fuel in the cells will be combustible under some conditions. This is a more hazardous condition with jet engine fuels than it is with gasoline because of the low vapor pressure of jet engine fuels.

In the above mentioned copending application, a complete system for maintaining all such spaces under slight positive pressure with an inert gas is explained and illustrated. In general, the principle involved is to form a precisely constituted combustible mixture of the aircraft fuel and air in a special sealed burner and to burn this mixture under carefully controlled conditions so as to obtain products of combustion which are rich in nitrogen and carbon dioxide with only slight traces of oxygen being present. This mixture is then cooled and treated to remove the major portion of the water formed by the combustion and corrosive substances, similarly formed, before passing the gases to the spaces to be purged. In any such system, considerable water formed as a product of combustion is condensed from the gases during the cooling step and can subsequently be separated in its liquid phase. There is danger under some conditions, however, that excessive cooling of the products of combustion may reduce their temperature below the freezing point of water with the result that the water condensed out of the products of combustion may freeze within the heat exchange system or subsequent passages, thereby causing malfunctioning of the apparatus. The system which forms the subject matter of the present invention is for the purpose of preventing freezing in such generators and was shown and described as a portion of the structure in the above referred to copending application in order to provide a complete and satisfactory structure to serve as the basis for that application.

Because the apparatus of the present invention is the same as that described and illustrated in the previously referred to copending application, the equipment which embodies the present invention need not be described in detail here and therefore will be outlined only briefly, detailed discussion being reserved for the portions of the structure which deal specifically with the prevention of freezing in the combustion gas passages of the aircraft purge generator and the subsequent passages under the wide variation in circumstances which prevail in the use of equipment of this character.

In view of the above, it is one of the objects of the present invention to provide a novel, simple and effective means for preventing freezing in the combustion gas passages of an aircraft purge generator which is effective under a wide variation in circumstances.

A further object is to accomplish the above with a minimum of equipment and in such manner as to take full advantage of equipment already available in a jet powered aircraft.

Other objects and advantages will become apparent from the following description of a preferred embodiment of my invention which is illustrated in the accompanying drawings, in which:

Fig. 2 is a perspective view of the portion of the apparatus most immediately concerned with the present invention, with sections of the side wall being broken away so as to reveal the underlying structure; and Fig. 3 is a simplified electrical circuit diagram of the freeze prevention portion of the apparatus.

Figure 1:
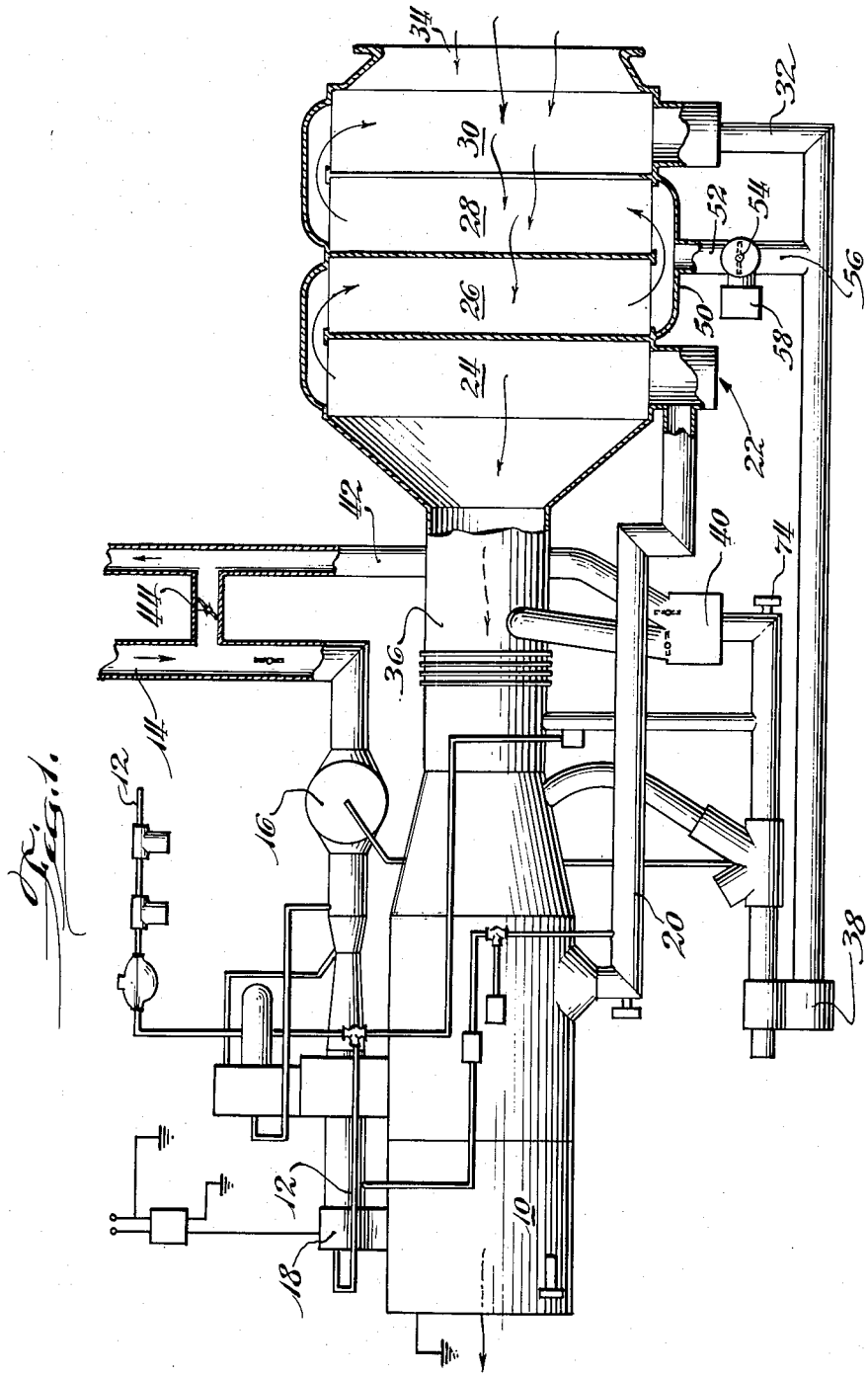
Figure 1 is a diagrammatic representation of a purge gas generator in which features of the present invention have been embodied.

Referring now to Fig. 1 of the drawings, the apparatus generally comprises a burner and primary heat exchanger indicated at 10 which receives liquid engine fuel from a line 12, having fuel flow regulating accessory equipment associated therewith, and air by way of a line 14. The air flows to the burner by way of a flow regulator 16, the air entering the heater at 18. Within the assembly 10, the fuel and air are mixed, are ignited and burned to produce products of combustion which have their temperatures reduced considerably by a primary heat exchanger associated directly with the burner. From this primary heat exchanger the tempered products of combustion leave by way of a duct 20 and pass to a secondary heat exchanger 22. These hot gases will arrive at the secondary heat exchanger at temperatures which may under some circumstances be very high.

Within the secondary heat exchanger the products of combustion ordinarily make four passes indicated at 24, 26, 28 and 30, through four groups of tube bundles connected in series with the products of combustion exhausting from the last pass 30 by way of a duct 32. Ambient air collected by a scoop or ram, not shown, in the aircraft slip stream for cooling the two heat exchangers, enters the secondary heat exchanger by way of a shroud or adapter 34 and passes toward the left across the tube bundles 30, 28, 26 and 24 in that order and thence through a transition section 36 to the primary heat exchanger associated directly with the burner and within the structure indicated at 10, the heated air issuing from the left hand end of the assembly 10 and passing overboard through a duct, not shown. The hot gases and the cooling air therefore pass in counterflow relation to each other.

Within the duct 32 the products of combustion are cool, and a large portion of the water of combustion is in the liquid phase. It is therefore easily separated from the gas stream by a carbon and water cyclone type separator indicated at 38, the gases then passing through a valve box 40 to an outlet duct 42 which leads to the spaces to be purged. In order to permit air from the source, which is connected to the duct 14, to flow to the fuel cells when the purge gas generator is not operating, a bypass valve is provided at 44 in a cross connection between the inlet air duct 14 and the outlet gas duct 42.

From the above it will be seen that during normal operation of the system, cooling air entering from the shroud 34 passes into the casing of the secondary heat exchanger 22 and in succession comes into heat exchange contact with the tube bundle groups 30, 28, 26 and 24. With this counterflow arrangement, both the air and gas are at their lowest temperatures at the tube bundle pass

30. Under some conditions the ambient air entering the exchanger from the shroud 34 will be very cold or the flow rate may be very high as in a dive, and therefore under some conditions the products of combustion in the last pass 30, or possibly the last two passes 28 and 30, may be cooled below the freezing point, with the result that the tubes may become plugged with ice. If the temperatures are only marginally above these, ice may not form within the tubes 30 but the gases leaving the heat exchanger by the duct 32 will be so close to the freezing point that freezing may take place within the spaces to be purged or the lines to these spaces. To be safe against this latter possibility, it is preferred that the gases should arrive at the spaces to be purged at a temperature no lower than 40° F.

From Fig. 2 it will be seen that on the same side of the secondary heat exchanger 22 as the connection to the gas outlet duct 32 there is a sheet metal plenum chamber 50 which overlies the outlet ends of the group of tubes which forms the second pass 26 and the inlet ends of the group which forms the third pass 28. This plenum chamber is for the purpose of conducting the gases issuing from the second pass to the inlet end of the third pass. An L-shaped fitting 52 is connected to this plenum chamber 50 and leads to a flow control valve 54 connected on its outlet side to a T-fitting 56 connected into the cool gas line 32.

When the valve 54 is closed so as to shut off communication between the plenum chamber 50 and the outlet line 32, the hot gases received by the secondary heat exchanger are forced to pass in series through the four separate tube bundles before reaching the outlet line. On the other hand, if the valve 54 is open, these gases will take the shorter and lower pressure drop course directly from the plenum chamber 50 to the outlet line 32 by way of the valve 54, thereby producing substantially no gas flow in the last two tube bundles 28 and 30. Because of this restriction of the heat exchange surface when the valve 54 is open, the hot products of combustion will be subjected to considerably less cooling and therefore will arrive at the outlet duct 32 at a considerably higher temperature than would otherwise be the case.

The valve 54 is driven by a motor 58 of the reversing type through a speed reduction gear box. As is best seen in Fig. 3, the motor 58 is provided with a circuit 60 which operates to drive the motor 58 in such direction as to open the valve 50 when this circuit is energized. Similarly a second circuit 62 closes this valve when energized. The windings 60 and 62 receive energy by way of a pair of single pole, single throw limit switches 64 and 66, respectively, which are normally closed. These switches are connected to be operated by the motor 58 however, such that whenever the motor has driven the valve 54 to such position that the valve is opened completely, the switch 64 will be opened thereby deenergizing the opening motor circuit 60. Similarly, when the motor 58 is energized to run in the opposite direction to close the valve 54, the switch 64 is soon closed and the switch 66 will be opened when the valve has reached closed position.

The switch 64 is energized by a lead 70 connected to one of the stationary contacts 72 of a single pole, double throw, thermostatic switch 74, the movable switch element 76 of which is connected to one side of the airplane electrical circuit indicated at 78. The other side of this circuit is grounded as is one side of the motor 58. The other stationary contact 80 of the thermostatic switch 74 is connected by a lead 82 to the switch 66 in the motor closing circuit. The thermostatic switch 74 is so oriented that when it is heated to a temperature above approximately 45° F. the blade 76 moves so as to bring its contact against the contact 80. Below a somewhat lower temperature, depending upon the temperature differential of the switch, the switch blade 76 moves in the opposite direction so as to come against contact 72.

The thermostatic switch 74 is arranged so as to be sensitive to the temperature of the cooled products of combustion and may conveniently be located in the outgoing purge gas line as indicated in Fig. 1.

The system operates in the following manner: When the temperature of the products of combustion leaving the generator system, or in other words, when the temperature at the thermostatic switch 74 is above 45° F., the valve 54 will be closed, thereby causing the products of combustion to flow through all four passes 24, 26, 28 and 30 of the secondary heat exchanger 22 before reaching the cool gas outlet line 32. If now the temperature of the incoming cooling air drops sufficiently, or its flow rate increases sufficiently so that the total cooling effect upon the gases brought about by the two heat exchangers (the primary heat exchanger in the structure 10 and the secondary heat exchanger indicated at 22) is such as to cause the temperature of the products of combustion arriving at the thermostatic switch 74 to drop to less than 45° F., the switch blade 76 shifts its position so as to rest against contact 72. This energizes the opening circuit 60 for the valve motor by way of the limit switch 64. The valve motor 58 therefore runs the valve 54 toward open position, thereby immediately closing the limit switch 66 and eventually opening the limit switch 64 as soon as the valve is fully open.

Thereafter, the hot products of combustion pass from the plenum chamber 50 at an intermediate region of the gas passages in the secondary heat exchanger 22 directly to the outlet line 32 by way of the valve 54, with the result that the products of combustion arrive at the outlet line at a temperature considerably higher than if all of the heat exchange surface had been used.

Whenever the temperature of the products of combustion at the thermostatic switch 74 rises to a point somewhat above 45° F. (depending upon the switch differential) the thermostatic switch blade 76 will again shift its position so as to energize the closing circuit 62 of the valve motor 58. When thus energized, the motor drives the valve 54 to closed position, thereby forcing the products of combustion to flow through all of the passes of the secondary heat exchanger before arriving at the outlet line 32. The cycling of the valve as described above takes place as necessary so as to maintain the temperature of the products of combustion leaving the purge gas generator above 45° F., while at the same time assuring adequate cooling, so as to prevent the temperature of these products of combustion from rising too high under more temperate conditions.

Although this invention has been described in conjunction with a specific system, it will be appreciated that depending upon the conditions prevailing in the particular installation, and to some extent upon the design of the equipment, it might be well to short-circuit or bypass a greater or lesser portion of the gas passages in the secondary heat exchanger.

Essentially the main feature of the invention is the arrangement in a purge gas generator by which under some circumstances all of the cooling surface of the heat exchanger is utilized for removing heat from the hot products of combustion, but such that under conditions where the temperature of the outgoing products of combustion under these conditions would be near the freezing point, a portion of the gas passages at the cold end of the heat exchange system will be bypassed so as to reduce the efficiency of the heat exchanger enough to compensate for the extremely low temperature of the cooling air.

Having described my invention, what I claim is new and useful and desire to secure by Letters Patent of the United States is:

1. A purge gas generating system adapted for use in an aircraft which has a source of air under pressure, a ram and a duct leading therefrom serving as a source of cooling air, and duct work leading to spaces to be purged, the combination comprising: means forming a conduit having an inlet adapted for connection to said source of air under pressure, said conduit having an outlet connection; sealed combustion chamber means having an air inlet, a fuel inlet and an outlet for products of combustion, said combustion chamber air inlet being connected to said conduit outlet connection, means for supplying fuel to said fuel inlet, means forming a heat exchanger having a plurality of gas passes therein connected in series, means connecting one end of said series to said combustion chamber outlet, means adapted for connecting the other end of said series to said duct work leading to spaces to be purged, means forming an air passage through said heat exchanger such that air in said passage is in heat exchange relation to said passes, means for connecting one end of said air passage to said cooling air duct, bypass means connected between one end of said series and an intermediate portion thereof for short-circuiting some of said passes, valve means in said bypass for opening and closing the same, means sensitive to the temperature of the products of combustion downstream of said passes for opening and closing said valve as the temperature of said temperature sensitive means respectively falls below and rises above approximately 45° F.

2. In a purge gas generating system adapted for use in an aircraft which has a source of air under pressure, a ram and a duct leading therefrom serving as a source of cooling air, and duct work leading to spaces to be purged, the combination comprising: means forming a conduit having an inlet adapted for connection to said source of air under pressure, said conduit having an outlet connection; sealed combustion chamber means having an air inlet, a fuel inlet and an outlet for products of combustion, said combustion chamber air inlet being connected to said conduit outlet connection, means for supplying fuel to said fuel inlet, means forming a heat exchanger having a plurality of gas passes therein connected in series, means connecting one end of said series to said combustion chamber outlet, means adapted for connecting the other end of said series to said duct work leading to spaces to be purged, means forming an air passage through said heat exchanger such that air in said passage is in heat exchange relation to said passes, means for connecting one end of said air passage to said cooling air duct, bypass means connected between one end of said series and an intermediate portion thereof for short-circuiting some of said passes, valve means in said bypass for opening and closing the same, means sensitive to the temperature of the products of combustion downstream of said passes for opening and closing said valve as the temperature of said temperature sensitive means respectively falls below and rises above a level indicative of an approach to freezing conditions at some place within the spaces to be purged.

References Cited in the file of this patent
UNITED STATES PATENTS

| | | |
|---|---|---|
| 1,711,365 | Summers | Apr. 30, 1929 |
| 1,916,004 | Langford | June 27, 1933 |
| 2,254,481 | Harris | Sept. 2, 1941 |
| 2,645,080 | Newcomb | July 14, 1953 |